United States Patent [19]

Bocsanczy et al.

[11] 4,265,709
[45] May 5, 1981

[54] METHOD AND APPARATUS FOR SEPARATING GASES AND SOLIDS DURING THE CARBONIZATION OF COAL

[75] Inventors: Janos Bocsanczy, Recklinghausen; Ludwig Offermann, Datteln; Dieter Stalherm, Recklinghausen, all of Fed. Rep. of Germany

[73] Assignee: Firma Carl Still, Fed. Rep. of Germany

[21] Appl. No.: 9,602

[22] Filed: Feb. 5, 1979

[30] Foreign Application Priority Data

Feb. 6, 1978 [DE] Fed. Rep. of Germany ....... 2804934

[51] Int. Cl.$^3$ .................... C10B 27/04; C10B 27/06
[52] U.S. Cl. ........................................ 201/4; 201/40; 202/257; 202/258; 202/261
[58] Field of Search .................... 201/3, 4, 41, 40; 202/254, 255, 256, 257, 258, 261, 263, 262

[56] References Cited

U.S. PATENT DOCUMENTS

| 3,243,360 | 3/1966 | Wethly | 202/256 |
|---|---|---|---|
| 3,804,721 | 4/1974 | Gidick | 202/258 X |
| 3,956,073 | 5/1976 | Carbone et al. | 202/254 |
| 4,100,033 | 7/1978 | Holter | 202/263 X |
| 4,137,128 | 1/1979 | Watson | 202/256 |
| 4,176,011 | 11/1979 | Knappstein | 202/261 X |

FOREIGN PATENT DOCUMENTS 321535 2/1972 U.S.S.R. .................... 202/263

*Primary Examiner*—Arnold Turk
*Attorney, Agent, or Firm*—John J. McGlew

[57] ABSTRACT

A device for separating gases and solids, particularly coal dust, during the carbonization of coal, particularly predried and preheated fine coal in coke ovens arranged in a battery which includes a standpipe extending upwardly from the top of the battery having a bend extending from the top of the standpipe downwardly into a collecting main, comprises, a vertically extending standpipe which extends upwardly from the top of the battery and has a bend at the top thereof extending outwardly and downwardly from the top and which includes a longitudinally extending collecting main connected into the lower end of the bend with a solids discharge line overlying the bend and extending substantially parallel to the collecting main. The solids matter discharge line includes a connection extending downwardly into the bend. Means are provided for spraying a liquid into the bend over the collecting line and the solids matter discharge line includes a shutoff control in the connection to the bend. Exhauster means are connected to the solids matter discharge line for exhausting the gases enriched with the solids to a combustion furnace where they are burned. The combustion furnace may be one which heats water to form steam which is supplied back into the collecting line. Some of the solids which are removed are directed to a cyclone separator where coal dust is separated therefrom and the gas is returned to the collecting line. With the method of the invention, the bend is selectively connected to the solids matter discharge line so that gases containing solids are withdrawn therefrom and part of them are directed to a separator to remove the coal dust solids and to return the gases to the collecting main and other parts are directed to the furnace for burning therein.

9 Claims, 2 Drawing Figures

METHOD AND APPARATUS FOR SEPARATING GASES AND SOLIDS DURING THE CARBONIZATION OF COAL

FIELD AND BACKGROUND OF THE INVENTION

This invention relates to coke oven devices in general and, in particular, to a new and useful apparatus and method for separating gases and solids, particularly coal dust, during the carbonization of coal.

DESCRIPTION OF THE PRIOR ART

Devices for separating gases and solids during coal carbonization are known in the prior art for a long time ("Ullmann's Encyclopedia of Chemical Engineering", Volume 10, Third Edition, Munich, Berlin, 1958, pages 271 ff). Aside from the separation of solids from the hot crude coke oven gases, they also serve the purpose of cooling the gas. The removal of solids, i.e., mainly the coal dust entrained with the gas is necessary, since otherwise, they pass into the liquid condensates and render the separation of tar and water more difficult, reduce the quality of the tar and make the cleaning of the collecting main an expensive manual task.

In order to separate solids from the main amount of coke oven gases produced during the operation of charging coal into the coke oven chambers and, particularly coal loaded with dust, it is further known to exhaust the gases through separate standpipes into a duct, also termed a compensating main, and only after the coal in the oven chamber has settled, to direct the gases into the normal collecting main from which they pass to their treatment (See Ullmann, Vol. 10, pg. 278). Such a compensating main with the necessary connections to the normal collecting main is expensive and, therefore, is readily omitted in practice if other possibilities of separating the solids from the crude gas are given. In addition, a compensating main is exposed to strong fouling and must be cleaned frequently. Such work can only be done manually.

During the charging of coal into the oven chambers, but also limited to that short period of time, the charge gases, which are heavily loaded with dust, may be exhausted from the oven chamber itself by means of special devices so that the gas treatment plants are not burdened with these amounts of dust. Such devices are provided on the so-called charging cars from which the coal is fitted through charging chutes into the oven chambers. See German Pat. No. 2,114,585. As already mentioned, with such a design, the separation of solids is reduced to the short time of coal charging because as soon as the charging car has discharged its contents into the oven chamber, it is displaced again to the coal tower for a new supply.

In the carbonization of predried and preheated coal, it is further known to reduce the development of dust, particularly during the operation of charging the coke coal into the oven chamber, by admixing so-called additives with the coal. Such additives may comprise oils of any kind, for example, waste oil or used lubricating oil, or even industrial waste liquors, such as spent sulfite liquor, obtained from the production of cellulose. See German Patent Disclosure Nos. OS 2 457 528 and AS 2,514,007. The process of admixing such liquors to the coal involves considerable costs, particularly since the liquid amounts to be admixed are small and, in addition, the coal is hot during the admixture, and usually has a temperature in the range of 200°C. to 250°C. Additives also reduce the density of the coal charge in the oven chamber and thus impair the quality of the coke.

The sole purpose of the prior art devices described above is to reduce the entrainment of solids during the short time of charging into the oven chamber. However, primarily in the carbonization of predried and preheated coal, it is particularly important to separate the dust-laden coke oven gases from the following cleaner gases even after the short charging time, during the first period of carbonization, i.e., until the coal bed in the chamber has settled.

SUMMARY OF THE INVENTION

The present invention is therefore directed to a device which makes it possible to reduce the dust transfer into the gas for a long period of time, not only during the charging time, with simple means and without disadvantageous secondary effects for the final coke product and, in addition, to keep the tar free from solids and the collecting main free from deposits, so as to maintain a constant level of the heat balance of the collecting main.

In accordance with the invention, a vertically extending standpipe extends upwardly from the top of the coke oven battery and has a bend at the top thereof which extends backwardly and downwardly from the top into a longitudinally extending collecting main. A solids matter discharge line is arranged to overlie the bend and has a connection which extends downwardly into the bend and may be opened or sealed therefrom by water seals or be isolated therefrom by a shutoff valve or shutter control valve. Means are provided for spraying a liquid downwardly into the bend over the collecting main and the bend itself may be isolated from the collecting main by water seal or closure. Some of the gases with entrained solids are directed to a separator for removing the coal dust solids and for returning the gases back to the collecting main while other gases or solids are directed to a furnace for combustion therein. The furnace may advantageously operate a boiler to form steam which is directed back into the collecting main.

In accordance with the invention, the gases of low calorific value, but heavily laden with coal dust, which are produced during and still after the charging operation, namely, from a very finely pulverized predried and preheated coal, are removed through the standpipes by suction and, while the bends are shut off, through the cleared connecting conduits into the solid exhaust line and are then burned in a combustion furnace.

It is advantageous to connect the waste gas outlet of the combustion furnace, possibly with the interposition of an electrical precipitator, to the chimney of the respective coke oven battery. Such a connecting pipe provides a simple possibility of discharging the exhaust gases.

To recover the heat of the exhaust gases, the combustion furnace may be followed by a heat exchanger. This may be a steam generator or a direct or indirect heat exchanger for heating solids, for example, a flash drier or a heat exchanger for heating liquids.

The steam thus produced may be directed, for example, entirely or partly into the collecting main so as to increase the heat content of the coke oven gas produced from the predried coal. See German Patent Application No. P 26 47 079.1. Due to the high heat capacity of the coke oven gas, the separation from each other of condensed tar and water may be shifted into a high temperature range and thus supported. For this purpose, the steam generator is connected through a pipe to the collecting main. The solid-laden gases from the coke oven battery may also be utilized in the plant for preheating and predrying the coal to be carbonized in the battery. Since the coke ovens are charged periodically and in definite time intervals, the amount of charge gas and coal dust also increases and decreases periodically. Because of these periodical variations, it is necessary to supply the combustion furnace in which the gas needed for the predrying and preheating is produced during the periods of lower charge gas and coal dust development with another fuel, for example, gas from the coke oven plant or even coal dust from another source to balance the amount. This amount decreases at the same rate as the charge gas and its dust content increases. This is a problem of varying fuel supply which has already been solved in the art. To shut off the connection between the bend and the solid exhaust line, a liquid seal is preferably provided.

In another embodiment of the invention, a high-performance dust separator, for example, a cyclone system, may be provided between the solid removal line and the exhauster, so that the dust is precipitated to a large extent and the cleaned gas can be returned into the collecting main through a pipe connection between the pressure side of the exhauster and the collecting main. The calorific value of the coke oven gas is thereby reduced and its amount is increased in the desired manner. In this case again, the coal dust precipitated in the cyclone is preferably utilized in the plant itself.

Accordingly, an object of the invention it to provide a device for separating gases and solids, particularly coal dust, during the carbonization of coal, particularly predried and preheated fine coal in coke ovens, which are arranged in a battery, and includes a vertically extending standpipe extending upwardly from the top of the battery and a bend extending downwardly from the top of the standpipe into a longitudinally extending collecting main and which includes a solids matter discharge line overlying the bend and extending substantially parallel to the collecting main and having a connection extending downwardly into the bend with a shutoff control in the connection and which includes a combustion furnace adjacent the battery with exhauster means connected to the solids matter discharge line and to the combustion furnace for supplying solids-laden gases to the furnace for the combustion thereof.

A further object of the present invention is to provide a method of operating a coke oven which has a vertical standpipe extending out of the top of the oven with a bend extending downwardly from the top into a longitudinally extending collecting main and which comprises connecting the bend to the solids matter discharge line and withdrawing some of the gases containing solids through the solids matter discharge line to a separator to remove the coal dust solids and return the gases to the collecting main and delivering at least a portion of the solids and gases to a combustion furnace to burn them in the combustion furnace, and advantageously, heating water in the combustion furnace to form steam which is directed back to the collecting line and preferably directing a spray of water into the bend over the connection to the collecting main.

Another object of the invention is to provide a device for separating gases and solids during the carbonization of coal which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
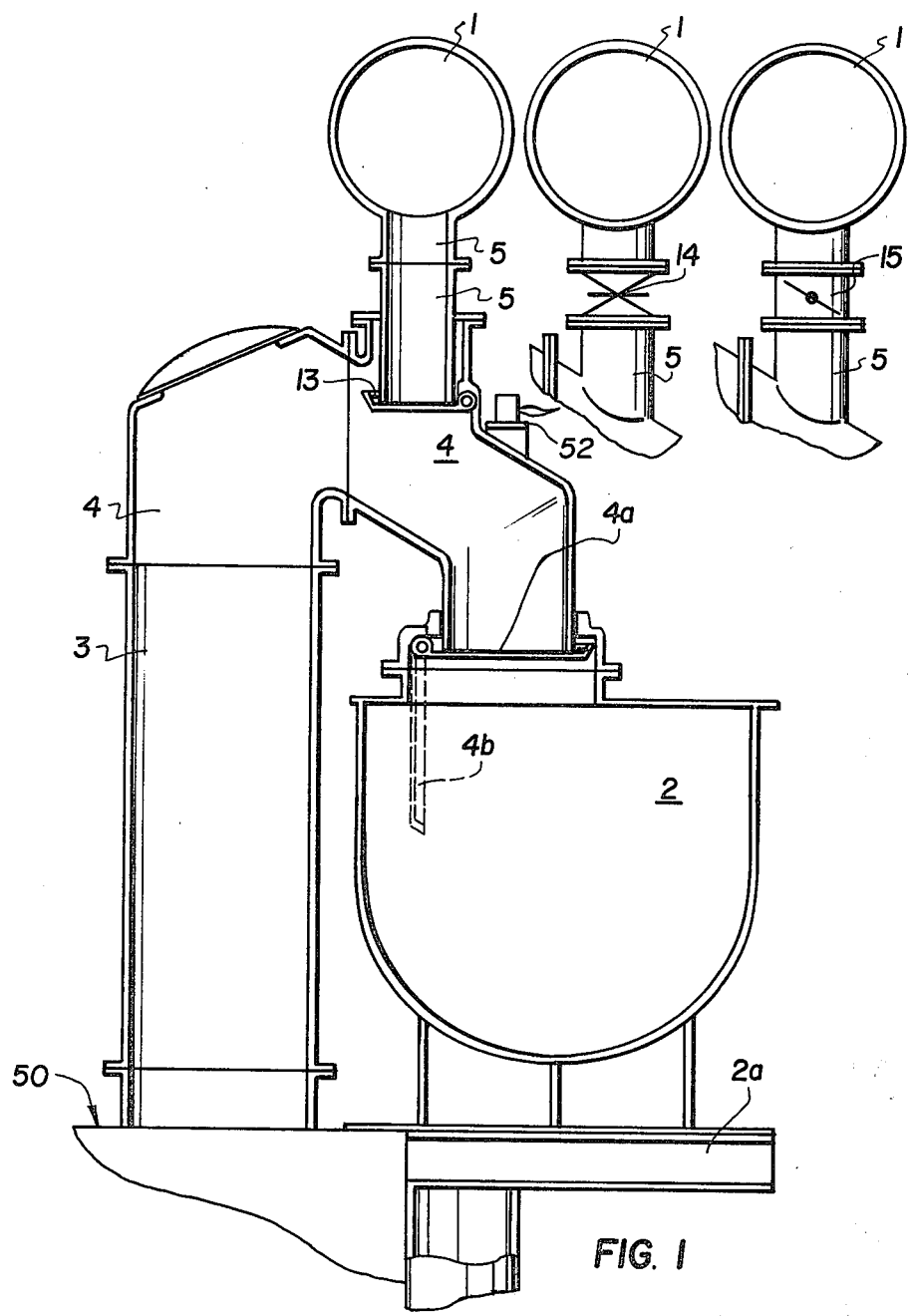
FIG. 1 is a partial top sectional view of a coke oven having a solids matter removal device constructed in accordance with the present invention.

Referring to the drawings in particular, the invention embodied therein, comprises a device for separating gases and solids, particularly coal dust, during the carbonization of coal, particularly predried and preheated fine coal, in a coke oven, generally designated 50, which has a top portion thereof with a standpipe 3 extending outwardly therefrom connected at its top to a bend 4 which extends back downwardly from the top to a closing portion 4a which extends into the top of a longitudinally extending collecting main 2.

In the drawings, the solid matter discharge line 1 is connected to the bends 4 of the standpipes 3 through connecting pipes 5. Shut-off valves 14 or shutter leaves 15 are provided in the connecting pipes 5. Connecting pipes 5 may be shut off toward the bends 4 of the standpipes 3 by means of water seals 13. 3 is designated the standpipe and 4a is the closing position of the water seal of bend 4. The water seal is shown in the open position at 4b. The collecting main is designated 2 and 2a is the supporting structure thereof. Water spray means 52 are provided for directing a water spray into the bend at the closing portion or section 4a over the collecting main 2.

Figure 2:
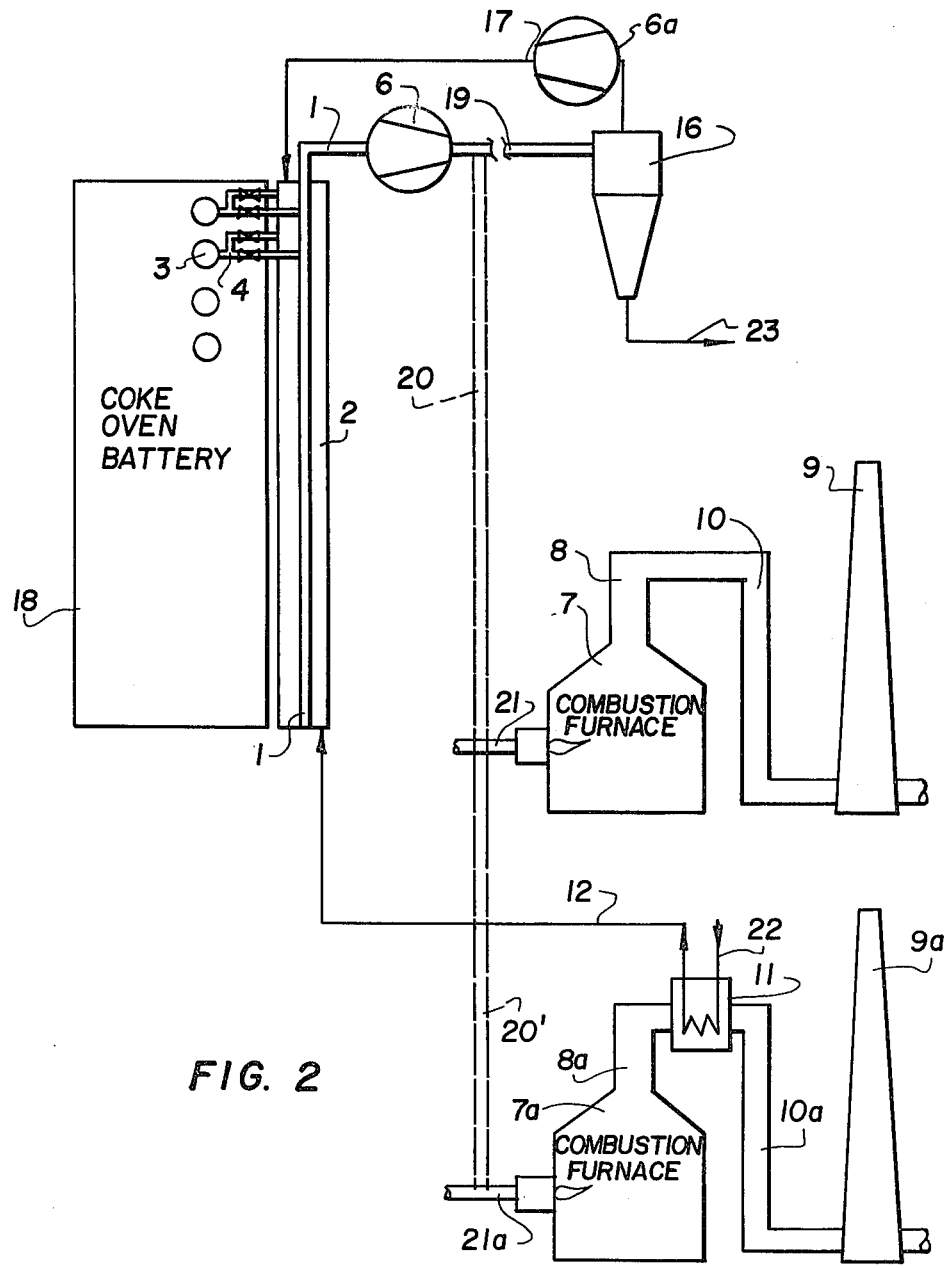
FIG. 2 is a partial top view and schematic representation of the solids matter removal device shown in FIG. 1.

FIG. 2 shows the battery at 18, the exhauster 6 provided at the end of the solid discharge line 1, and line 19 through which the gas, enriched with solid matter, i.e., the coal dust, is supplied through pipe 20, shown in dotted lines, and line 21 to the combustion furnace 7, from where the combustion gases escape through lines 8 and 10 to the flue or chimney 9.

Another embodiment of the invention provides that the gas containing coal dust is supplied to a combustion furnace 7a through lines 20, 20' and 21a. The hot combustion gases pass through a flue 8a into a waste-heat boiler 11 which is supplied with soft water through a line 22 and from which the steam is discharged through a line 12. The steam from line 12 is fed into collecting main 2. The combustion gases pass through a line 10a into the chimney 9a.

The gases containing coal dust may also be directed from the solid discharge line 1 through line 19 into a cyclone system 16 where the dust is precipitated. The separated coal dust is removed from cyclone 16 through a line 23 and may be used, for example, for preheating the coke coal. The gases free from dust are returned through a line 17 and the exhauster 6a to the collecting main 2.

While specific embodiments of the invention have been shown and described in detail to illustrate the application of the principles of the invention, it will be understood that the invention may be embodied otherwise without departing from such principles.

What is claimed is:

1. A device for separating gases and solids, particularly coal dust, during the carbonization of coal, particularly predried and preheated fine coal in coke ovens which are arranged in a battery, comprising, a vertically extending standpipe extending upwardly from the top of a battery having a bend at the top thereof extending outwardly and downwardly towards a lower end, a longitudinally extending collecting main connected into the lower end of said bend, a solids discharge line overlying said bend and extending substantially parallel to said collecting main and having a connection extending downwardly into said bend, means for directing a spray of water into the bend over its connection to said collecting main and under said solids discharge line, a shutoff control in said connection, a combustion furnace adjacent the battery, and exhauster means connected between said solids discharge line and said combustion furnace for supplying solid-laden gases to said combustion furnace for a combustion therein whereby said solids discharge line with said laden gases remains substantially dry.

2. A device for separating gases and solids, as claimed in claim 1, wherein said combustion furnace includes an exhaust flue and a chimney connected to said exhaust flue.

3. A device for separating gases and solids, as claimed in claim 1, wherein said combustion furnace includes means therein for transferring heat therefrom for preheating the gases in said collecting main.

4. A device for separating gases and solids, as claimed in claim 1, wherein said shutoff member in said connection comprises a liquid seal.

5. A device for separating gases and solids, as claimed in claim 1, including a cyclone separator connected to said solids discharge line and having a solids discharge for the collection of coal dust solids and a gas discharge for recycling gas back to said collecting main.

6. A device for separating gases and solids, as claimed in claim 1, wherein said combustion furnace comprises a waste heat boiler for generating steam.

7. A device for separating gases and solids, as claimed in claim 6, wherein said waste heat boiler includes a steam connection to said collecting main.

8. A method of operating a coke oven to charge the oven with coal and carbonize the coal, the oven having a vertical standpipe extending out of the oven with a bend extending from the top of the standpipe back downwardly to a longitudinally extending collecting main, comprising, connecting the bend to a solids matter discharge line during charging of the oven and at least part of the carbonizing and withdrawing some of the gases containing solids to the solids matter discharge line, directing the gases containing solids collected in the solids matter discharge line to a separator to remove the coal dust solids therefrom and to return the gases to the collecting main, delivering at least a portion of the solids removed to a combustion furnace to burn them, and directing a spray of water into the bend over the collecting main and under the solids matter discharge line.

9. A method of operating a coke oven, as claimed in claim 8, including forming steam by the burning of the gases containing solids and directing the steam to the collecting line.

* * * * *